United States Patent
Kim et al.

(10) Patent No.: US 10,774,254 B2
(45) Date of Patent: Sep. 15, 2020

(54) LIGHTWEIGHT POLYMER COMPOSITION HAVING EXCELLENT THERMAL CONDUCTIVITY, METHOD OF PREPARING THE SAME AND PRODUCT USING THE SAME

(71) Applicants: Hyundai Motor Company, Seoul (KR); Kia Motors Corporation, Seoul (KR); THERMATEC CO., LTD., Daegu (KR)

(72) Inventors: Ji Eun Kim, Seoul (KR); Sang Soo Jeon, Gyeonggi-do (KR); Sung Hoon Kim, Daegu (KR)

(73) Assignees: Hyundai Motor Company, Seoul (KR); Kia Motors Corporation, Seoul (KR); THERMATEC CO., LTD., Daegu (KR)

( * ) Notice: Subject to any disclaimer, the term of this patent is extended or adjusted under 35 U.S.C. 154(b) by 134 days.

(21) Appl. No.: 16/178,070

(22) Filed: Nov. 1, 2018

(65) Prior Publication Data

US 2019/0367791 A1 Dec. 5, 2019

(30) Foreign Application Priority Data

Jun. 1, 2018 (KR) .................. 10-2018-0063642

(51) Int. Cl.
| | | |
|---|---|---|
| C08L 83/04 | (2006.01) | |
| C09K 5/14 | (2006.01) | |
| C08J 3/22 | (2006.01) | |
| C08J 5/18 | (2006.01) | |
| B60K 6/28 | (2007.10) | |
| B60L 58/26 | (2019.01) | |

(52) U.S. Cl.
CPC .................. *C09K 5/14* (2013.01); *C08J 3/226* (2013.01); *C08J 5/18* (2013.01); *C08L 83/04* (2013.01); *B60K 6/28* (2013.01); *B60L 58/26* (2019.02); *C08J 2383/05* (2013.01); *C08J 2383/07* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 3,699,073 A | * | 10/1972 | Wada et al. ............. | C08L 83/04 524/785 |
| 4,031,059 A | * | 6/1977 | Strauss .................... | C08L 83/04 523/179 |
| 4,112,179 A | * | 9/1978 | Maccalous ............... | B05D 5/02 427/387 |
| 4,433,069 A | * | 2/1984 | Harper .................... | C08J 9/0085 521/103 |
| 4,581,391 A | * | 4/1986 | Baldwin .................. | C08K 3/34 523/179 |
| 5,262,454 A | * | 11/1993 | Leroux .................... | C08K 3/04 523/218 |
| 5,661,198 A | * | 8/1997 | Inatani .................... | C08K 7/14 523/179 |
| 5,905,101 A | * | 5/1999 | Fujiki ...................... | B64G 1/58 523/138 |
| 6,623,864 B1 | * | 9/2003 | Sweet ...................... | B32B 7/12 428/447 |
| 6,627,697 B2 | * | 9/2003 | Barney .................... | C09D 183/04 427/387 |
| 2003/0047718 A1 | * | 3/2003 | Narayan .................. | C08K 9/02 252/500 |
| 2007/0035224 A1 | * | 2/2007 | Yee ......................... | G03B 21/16 313/46 |
| 2012/0029090 A1 | * | 2/2012 | Brugger .................. | C08G 65/22 514/772.7 |
| 2012/0094036 A1 | * | 4/2012 | Droege .................... | C09D 7/70 427/600 |
| 2013/0082369 A1 | * | 4/2013 | Kokubo .................. | H01L 23/296 257/666 |
| 2015/0376452 A1 | * | 12/2015 | Courter ................... | B64G 1/62 523/179 |

FOREIGN PATENT DOCUMENTS

KR 10-1413065 B1 7/2014

* cited by examiner

*Primary Examiner* — Robert S Loewe
(74) *Attorney, Agent, or Firm* — Mintz Levin Cohn Ferris Glovsky and Popeo, P.C.; Peter F. Corless

(57) ABSTRACT

Disclosed is a composition for a heat dissipation pad, for example, a heat dissipation sheet in a cooling system for a water-cooling-type battery pack in a vehicle, for example, an electric vehicle. The heat dissipation pad may dissipate heat generated from the battery pack. Further disclosed is a method of manufacturing a heat dissipation pad having high thermal conductivity and low specific gravity. The composition may include the polymer composition including a carbon fiber, aluminum hydroxide and hollow glass beads.

20 Claims, No Drawings

LIGHTWEIGHT POLYMER COMPOSITION HAVING EXCELLENT THERMAL CONDUCTIVITY, METHOD OF PREPARING THE SAME AND PRODUCT USING THE SAME

CROSS REFERENCE TO RELATED APPLICATION

The present application claims priority to Korean Patent Application No. 10-2018-0063642, filed Jun. 1, 2018, the entire contents of which is incorporated herein for all purposes by this reference.

TECHNICAL FIELD

The present invention relates to a polymer composition for a heat dissipation pad of a vehicle, which may be provided in a cooling system of the vehicle to dissipate heat.

BACKGROUND OF THE INVENTION

Conventional heat dissipation sheets have been manufactured by adding a liquid polymer binder such as a thermosetting silicone gel or UV-curable acryl with a thermally conductive ceramic filler such as aluminum oxide ($Al_2O_3$), aluminum hydroxide ($Al_3(OH)_2$), aluminum nitride, boron nitride (BN), silicon carbide, or the like.

Although a heat dissipation sheet, manufactured by adding a liquid polymer binder with at least one of the thermally conductive ceramic fillers listed above, may improve the thermal conductivity of a product due to high specific gravity of filler materials (e.g., 2.4 or greater), weight of the product may not be sufficiently reduced.

Thus, there are in need of a material having low specific gravity, which may contribute to the reduction in size and weight of products in many fields.

SUMMARY OF THE INVENTION

The related art has not proposed compositions or component proportions able to reduce the weight of products while increasing the thermal conductivity thereof, and moreover, is limited to realizing a thermally conductive polymer composition that enables the specific gravity of a product to be 1.5 or less.

In preferred aspects, the present invention provides a polymer composition ("thermally conductive polymer composition") that may increase the thermal conductivity of a heat dissipation product, and a method of preparing the thermally conductive polymer composition. In addition, the polymer composition may have a specific gravity of about 1.5 or less.

In one aspect of the present invention, provided is a polymer composition that may include: 100 parts by weight of a silicone-based resin, about 20 parts by weight to 50 parts by weight of a carbon fiber, about 100 parts by weight to 200 parts by weight of an inorganic filler, and about 20 parts by weight to 50 parts by weight of hollow glass beads. All parts by weight are based on 100 parts by weight of the silicone-based resin.

The silicone-based resin may include a first silicone-based resin including a first polysiloxane containing one or more vinyl groups at both ends thereof and a second silicone-based resin including a second polysiloxane containing one or more vinyl groups at both ends thereof and a third polysiloxane having Si—H bonds.

The term "polysiloxane" as used herein refers to a polymeric compound including repeating units of siloxane or Si—O—Si linkages, which may include other functional groups (e.g., vinyl groups) or substituents The first polysiloxane and the second polysiloxane may be the same or different.

For example, the first polysiloxane or the second polysiloxane may suitably have a formula of Chemical Formula 1:

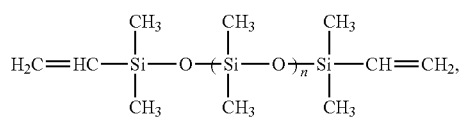

wherein n is an integer of 100 to 200.

In addition, the third polysiloxane may suitably a structure of Chemical Formula 2:

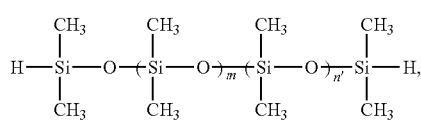

wherein n' may be an integer of 1 to 100 and m may be an integer of 1 to 100.

The first silicone-based resin may further include a retarding agent comprising a compound of Chemical Formula 3:

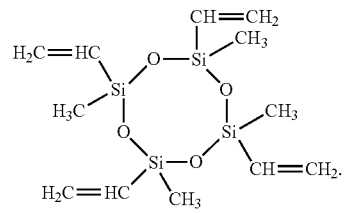

The carbon fiber may suitably have a diameter of about 5 μm to 15 μm.

The carbon fiber may suitably have a length of about 50 μm to 250 μm.

The carbon fiber may suitably have a thermal conductivity of about 500 W/mK to 900 W/mK.

The carbon fiber may suitably have a density of suitably 2.00 g/cm³ to 2.40 g/cm³.

The inorganic filler may suitably be aluminum hydroxide ($Al(OH)_3$) having a diameter of about 1 μm to 100 μm, aluminum oxide ($Al_2O_3$) having a diameter of about 2 μm to 150 μm, and a mixture thereof.

The hollow glass beads may suitably have a density of about 0.2 g/cm³ to 0.8 g/cm³.

The hollow glass beads may suitably have a thermal conductivity of about 0.1 W/mK to 0.2 W/mK.

The hollow glass beads may suitably have a diameter of about 35 μm to 45 μm.

In an aspect, provided is a heat dissipation pad including the polymer composition as described herein.

The heat dissipation pad may have a thermal conductivity of about 1.5 W/mK to 5.0 W/mK and a specific gravity of about 1.1 to 1.5.

In another aspect, provided is a method of manufacturing a heat dissipation pad. The method may include: preparing an admixture A by mixing a first silicone-based resin including a first polysiloxane containing one or more vinyl groups at both ends thereof with a carbon fiber; preparing an admixture B by mixing a second silicone-based resin including a second polysiloxane containing a vinyl group at both ends thereof and a third polysiloxane having Si—H bonds with hollow glass beads; obtaining a polymer composition by mixing the mixed solution A, the mixed solution B and an inorganic filler; and forming the polymer composition into a predetermined form shape then performing curing.

The carbon fiber may have a diameter of about 5 μm to 15 μm, a length of about 50 μm to 250 μm, a thermal conductivity of about 500 W/mK to 900 W/mK, and a density of about 2.00 g/cm³ to 2.40 g/cm³.

The hollow glass beads may have a density of about 0.2 g/cm³ to 0.8 g/cm³, a thermal conductivity of about 0.1 W/mK to 0.2 W/mK, and a diameter of about 35 μm to 45 μm.

The method may further include applying the polymer composition on a substrate to form the predetermined shape in a sheet or a roll.

A temperature for the curing may suitably range from a room temperature to 200° C.

The term "room temperature" as used herein refers to a temperature ranging from about 15° C. to about 25° C.

Further provided is a vehicle that may include the heat dissipation pad as described herein.

A heat dissipation pad, manufactured using a thermally conductive polymer composition according to various exemplary embodiments of the present invention, may have specific gravity reduced by about 40% or greater while manifesting equivalent thermal conductivity compared to conventional heat dissipation pads.

Other aspects of the invention are disclosed infra.

DETAILED DESCRIPTION

The above and other aspects, features and advantages of the present invention will be more clearly understood from the following preferred embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Moreover, as used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention provides a polymer composition, or a thermally conductive polymer composition, which may include a silicone-based resin, a carbon fiber, an inorganic filler and hollow glass beads.

The thermally conductive polymer composition may comprise 100 parts by weight of a silicone-based resin, about 20 parts by weight to 50 parts by weight of a carbon fiber, about 100 parts by weight to 200 parts by weight of an inorganic filler, and about 20 parts by weight to 50 parts by weight of hollow glass beads. All parts by weight are based on 100 parts by weight of the silicone-based resin.

In the present invention, the silicone-based resin may include a first silicone-based resin including a first polysiloxane containing one or more vinyl groups at both ends thereof and a second silicone-based resin including a second polysiloxane containing one or more vinyl groups at both ends thereof and a third polysiloxane having Si—H bonds.

For example, the first and the second polysiloxane containing one or more vinyl group at both ends thereof may be represented by Chemical Formula 1 below, and the third polysiloxane having Si—H bonds may be represented by Chemical Formula 2 below.

[Chemical Formula 1]

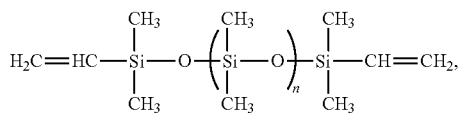

wherein n is an integer of 100 to 200.

[Chemical Formula 2]

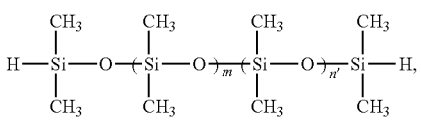

wherein n' may be an integer of 1 to 100 and m may be an integer of 1 to 100.

In the present invention, the first silicone-based resin may further include a platinum catalyst for an addition reaction. The platinum catalyst as used herein may promote the curing of the silicone-based resin, so that curing time may be a short period of time.

The platinum catalyst may be contained in an amount of about 0.10 wt % to 0.20 wt % based on the total weight of the first silicone-based resin. As such, the polysiloxane of Chemical Formula 1 may suitably contained in an amount of 99.80 wt % to 99.90 wt %.

In the present invention, the second silicone-based resin may further include a retarding agent. The retarding agent may include a compound represented by Chemical Formula 3 below.

The retarding agent may be contained in an amount of about 0.02 wt % to 0.05 wt % based on the total weight of the second silicone-based resin. As such, the polysiloxane of Chemical Formula 1 may be suitably contained in an amount of 95 wt % to 99 wt %, and the polysiloxane of Chemical Formula 2 may be preferably contained in an amount of 1 wt % to 5 wt % based on the total weight of the second silicone-based resin.

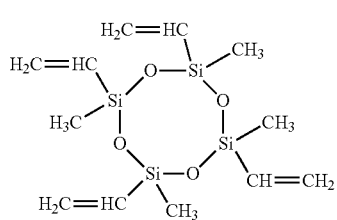

[Chemical Formula 3]

In the present invention, the silicone-based resin, i.e. the first silicone-based resin and the second silicone-based resin, may contained in an amount of about 25 wt % to 50 wt %, and preferably of about 28 wt % to 40 wt %, based on the total weight of the thermally conductive polymer composition.

The carbon fiber as used herein may improve the thermal conductivity of the composition.

The diameter of the carbon fiber may be of about 5 μm to 15 μm, the length of the carbon fiber may be of about 50 μm to 250 μm, the thermal conductivity of the carbon fiber may be of about 500 W/mK to 900 W/mK, and the density of the carbon fiber may be of about 2.00 g/cm³ to 2.40 g/cm³.

Preferably, the carbon fiber may have a density of about 2.00 g/cm³ to 2.30 g/cm³. In addition, the carbon fiber suitably may have a length of about 100 μm to 200 μm, or particularly about 100 μm to 150 μm. As such, a product manufactured using the composition of the present invention may have substantially improved thermal conductivity and reduced specific gravity, which are the most desirable.

Preferably, the carbon fiber may have a thermal conductivity of about 600 W/mK to 700 W/mK.

As such, when the length of the carbon fiber is less than about 50 μm, a sufficient carbon fiber array may not be formed in the component proportion range of the composition, making it difficult to exhibit required thermal conductivity. On the other hand, when the length thereof is greater than about 250 μm, uniform dispersion of materials may be difficult due to the increase in viscosity.

The carbon fiber may suitably be contained in an amount of about 20 parts by weight to 50 parts by weight, about 25 parts by weight to 45 parts by weight, and or particularly about 30 parts by weight to 45 parts by weight, based on 100 parts by weight of the silicone-based resin.

When the amount of the carbon fiber is less than about 20 parts by weight, the thermal conductivity of the thermally conductive polymer composition may not be sufficiently improved. On the other hand, when the amount thereof is greater than about 50 parts by weight, the insulating properties of products obtained using the thermally conductive polymer composition may deteriorate, and the manufacturing costs are unreasonably increased, thus negating economic benefits.

In the present invention, the inorganic filler may suitably be a thermally conductive inorganic filler and may be a ceramic filler, for example, aluminum oxide ($Al_2O_3$), aluminum hydroxide ($Al(OH)_3$), aluminum nitride (AlN), boron nitride (B N), silicon carbide and mixtures thereof. Preferably, a ceramic filler may include aluminum oxide, aluminum hydroxide and mixtures thereof. For example, the inorganic filler may include aluminum hydroxide or be aluminum hydroxide. When aluminum hydroxide is used, the specific gravity of a thermally conductive polymer composition or a product formed of the thermally conductive polymer composition may be effectively decreased without a reduction in thermal conductivity.

Preferably, the diameter of aluminum hydroxide ($Al(OH)_3$) may be about 1 μm to 100 μm, and the diameter of aluminum oxide ($Al_2O_3$) may be about 2 μm to 150 μm.

The thermally conductive inorganic filler may be included in an amount of about 100 parts by weight to 200 parts by weight, and about 100 parts by weight to 150 parts by weight, based on 100 parts by weight of the silicone-based resin.

When the amount of the thermally conductive inorganic filler is less than about 100 parts by weight, the amount of the thermal conductive material in the thermally conductive polymer composition may decrease, whereby thermal conductivity may be decreased. On the other hand, when the amount thereof is greater than about 200 parts by weight, the relative amount of the hollow glass beads may decrease, thus the specific gravity of a thermally conductive polymer composition or a product formed of the thermally conductive polymer composition may not be sufficiently decreased, and furthermore, the hardness of a cured product may increase, which is undesirable.

The hollow glass beads as used herein may decrease the specific gravity of a product, have a density of about 0.2 g/cm³ to 0.8 g/cm³, a thermal conductivity of about 0.1 W/mK to 0.2 W/mK, and a diameter of about 35 μm to 45 μm.

The hollow glass beads may be contained in an amount of about 20 parts by weight to 50 parts by weight, about 25 parts by weight to 45 parts by weight, or particularly about 30 parts by weight to 45 parts by weight, based on 100 parts by weight of the silicone-based resin. When the amount of the hollow glass beads is less than about 20 parts by weight, the reduction in the specific gravity of the thermally conductive polymer composition may not be sufficient, and the weight of a product formed of the thermally conductive polymer composition may not be sufficiently reduced. On the other hand, when the amount thereof is greater than about 50 parts by weight, the porosity of the product formed of the thermally conductive polymer composition may increase, thus decreasing thermal conductivity.

Further provided is a heat dissipation pad, including the aforementioned thermally conductive polymer composition.

For example, the heat dissipation pad, manufactured by mixing the silicone-based resin, carbon fiber, thermally conductive inorganic filler and hollow glass beads in amounts according to exemplary embodiments of the present invention, may have a thermal conductivity of about 1.5 W/mK to 5.0 W/mK and a specific gravity of about 1.0 to 1.5.

Still further provided is a method of manufacturing a heat dissipation pad. The method may include: preparing an admixture A by mixing a first silicone-based resin including a first polysiloxane containing one or more vinyl groups at both ends thereof with a carbon fiber; preparing an admixture B by mixing a second silicone-based resin including a second polysiloxane containing one or more vinyl groups at both ends thereof and a third polysiloxane having Si—H bonds with hollow glass beads; obtaining a thermally conductive polymer composition by mixing the admixture A, the admixture B and an inorganic filler; and forming the polymer composition into a predetermined form and then curing.

The method of manufacturing the heat dissipation pad according to an exemplary embodiment of the present invention is detailed stepwise. Here, a redundant description of the component proportions of the thermally conductive polymer composition and the features of individual components already mentioned above will be omitted.

The method of manufacturing the heat dissipation pad according to the present invention comprises:

a) preparing an admixture A by mixing a first silicone-based resin including a first polysiloxane containing one or more vinyl groups at both ends thereof with a carbon fiber;

b) preparing an admixture B by mixing a second silicone-based resin including a second polysiloxane containing one or more vinyl groups at both ends thereof and a third polysiloxane having Si—H bonds with hollow glass beads;

c) obtaining a thermally conductive polymer composition by mixing the admixture A, the admixture B and a thermally conductive inorganic filler; and d) forming the thermally conductive polymer composition into a predetermined form and then curing, for example, by thermal curing.

Before the above steps are commenced, the carbon fiber, the thermally conductive inorganic filler, and the hollow glass beads may be dewatered or dried in order to remove a water ingredient that hinders the rubberization of the silicone-based resin. As such, dewatering or drying may be preferably carried out at a temperature of about 130° C. for about 24 hr.

The preparation of the thermally conductive polymer composition after dewatering/drying may be carried out at room temperature. Here, room temperature may range from about 20° C. to 30° C. depending on the conditions in a laboratory.

Preferably, in step a), the first polysiloxane containing one or more vinyl groups at both ends thereof may be added with a carbon fiber and uniformly stirred, thus preparing an admixture A. The first polysiloxane may be further added with a platinum catalyst and mixed. The period of time required to prepare the admixture A may be suitably of about 1 to 2 hr.

In step b), hollow glass beads may suitably be dispersed in the second polysiloxane containing one or more vinyl groups at both ends thereof and the third polysiloxane having Si—H bonds, thus preparing the admixture B. As such, the second polysiloxane and the third polysiloxane may be further added with a retarding agent and mixed. The period of time required to prepare the mixed solution B may suitably be of about 1 to 2 hr.

In step c), the mixed solution A and the mixed solution B, in which the carbon fiber and the hollow glass beads are uniformly dispersed, respectively, may be placed in a vacuum stirrer together with a thermally conductive inorganic filler and stirred in a vacuum for about 1 to 2 hr, thus obtaining a thermally conductive polymer composition.

In step d), the thermally conductive polymer composition thus obtained may be applied on a release film and then thermally cured at a temperature ranging from room temperature (for example, 25±5° C.) to 200° C. depending on processing conditions, thereby manufacturing a product. The product thus manufactured may be in the form of a sheet or a roll.

EXAMPLES

Exemplary embodiments of the present invention will be given through the following examples, which are merely set forth to illustrate the present invention but are not to be construed as limiting the scope thereof. Thus, a person having ordinary knowledge in the art to which the present invention belongs (who is called "one skilled in the art" or an "average technician") will appreciate that various modifications, additions and substitutions are possible, without departing from the scope and spirit of the invention as disclosed in the accompanying claims.

The following properties were measured through methods below.

1) Thermal conductivity (W/mK)

Thermal conductivity was evaluated in accordance with ASTM D5470.

Measurement device: QTM-500, made by KYOTO ELECTRONIC, Japan

2) Specific gravity

Specific gravity was evaluated in accordance with ASTM D792.

Measurement device: EW-300SG, made by MIRAGE, Japan

Materials

1) Carbon fiber:

Length (100 μm, 150 μm), thermal conductivity (500 W/mK), and density (2.2 g/cm$^3$)

2) Hollow glass beads:

Average density of 0.40 g/cm$^3$, average thermal conductivity of 0.15 W/mK, and average diameter of 40 μm 3) Inorganic filler:

Amorphous aluminum hydroxide having a particle size of 50 μm

4) Retarding agent:

FD414 (made by DAMI POLYCHEM)

Manufacture of Sheet Having High Thermal Conductivity and Low Specific Gravity

Each of samples including the components in amounts shown in Table 2 below was prepared, placed in a vacuum stirrer at room temperature, and mixed for 1 hr with stirring in a vacuum, thus obtaining a slurry. Here, a two-component-type silicone gel has the composition of Table 1 below.

TABLE 1

| Component | Amount (%) |
|---|---|
| $H_2C=HC-\underset{\underset{CH_3}{\vert}}{\overset{\overset{CH_3}{\vert}}{Si}}-O-(\underset{\underset{CH_3}{\vert}}{\overset{\overset{CH_3}{\vert}}{Si}}-O)_n-\underset{\underset{CH_3}{\vert}}{\overset{\overset{CH_3}{\vert}}{Si}}-CH=CH_2$  (n is an integer of 100 to 200) | 98.24% |
| $H-\underset{\underset{CH_3}{\vert}}{\overset{\overset{CH_3}{\vert}}{Si}}-O-(\underset{\underset{CH_3}{\vert}}{\overset{\overset{CH_3}{\vert}}{Si}}-O)_m-(\underset{\underset{CH_3}{\vert}}{\overset{\overset{CH_3}{\vert}}{Si}}-O)_{n'}-\underset{\underset{CH_3}{\vert}}{\overset{\overset{CH_3}{\vert}}{Si}}-H$  (n′ and m each are an integer of 1 to 100) | 1.68% |
| Platinum catalyst | 0.06% |
| Cyclic siloxane with vinyl groups (structure shown) | 0.02% |

Each sheet was manufactured by applying the slurry to a thickness of 1 mm on a release film and then thermally curing it at a temperature of 110° C. for 4 hr, and was measured for thermal conductivity and specific gravity. The results are shown in Table 2 below.

TABLE 2

| | Example 1 | Example 2 | Example 3 | Example 4 | Comparative Example 1 | Comparative Example 2 | Comparative Example 3 |
|---|---|---|---|---|---|---|---|
| Two-component-type silicone gel | 100 parts by weight | 100 parts by weight | 100 parts by weight | 100 parts by weight | 100 parts by weight | 100 parts by weight | 100 parts by weight |
| Inorganic filler (Aluminum hydroxide) | 130 parts by weight | 150 parts by weight | 110 parts by weight | 130 parts by weight | 180 parts by weight | 110 parts by weight | 100 parts by weight |
| Hollow glass beads | 25 parts by weight | 25 parts by weight | 35 parts by weight | 25 parts by weight | | 10 parts by weight | 60 parts by weight |
| Carbon fiber | 30 parts by weight | 30 parts by weight | 40 parts by weight | 50 parts by weight | | 40 parts by weight | 30 parts by weight |
| Thermal conductivity (W/mK) | 1.833 | 1.907 | 1.869 | 2.256 | 1.805 | 1.913 | 1.440 |
| Specific gravity | 1.12 | 1.30 | 1.07 | 1.18 | 2.23 | 1.52 | 0.99 |

As is apparent from the above results, the sheets of Examples 1 to 4 had thermal conductivity of 1.5 W/mK or greater and specific gravity of 1.5 or less.

When comparing Example 1 with Example 2, when the amount of the inorganic filler was increased, thermal conductivity was increased but specific gravity was also increased.

When comparing Example 2 with Example 4, when the amount of the carbon fiber was increased, thermal conductivity was somewhat increased while specific gravity was decreased instead of the thermal conductivity of the inorganic filler.

In Example 3, the amounts of hollow glass beads and carbon fiber were adjusted, whereby high thermal conductivity and very low specific gravity were exhibited.

In Comparative Example 1, in which only the conventional inorganic filler was added without the use of hollow glass beads and carbon fiber, thermal conductivity was similar compared to Examples 1 and 3, but specific gravity was remarkably decreased.

In Comparative Example 2, the effect of the hollow glass beads was reduced and thus the specific gravity was relatively high compared to Examples.

In Comparative Example 3, in which the amount of the hollow glass beads was increased, the specific gravity was lowered but porosity of the sheet was increased, thus decreasing thermal conductivity.

Although various exemplary embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:

1. A polymer composition, comprising:
   100 parts by weight of a silicone-based resin;
   about 20 parts by weight to 50 parts by weight of a carbon fiber;
   about 100 parts by weight to 200 parts by weight of an inorganic filler; and
   about 20 parts by weight to 50 parts by weight of hollow glass beads,
   all parts by weight based on 100 parts by weight of the silicone-based resin.

2. The polymer composition of claim 1, wherein the silicone-based resin comprises:
   a first silicone-based resin comprising a first polysiloxane containing one or more vinyl groups at both ends thereof; and
   a second silicone-based resin comprising a second polysiloxane containing one or more vinyl group at both ends thereof and a third polysiloxane having Si—H bonds.

3. The polymer composition of claim 2, wherein the first polysiloxane or the second polysiloxane has a formula of Chemical Formula 1:

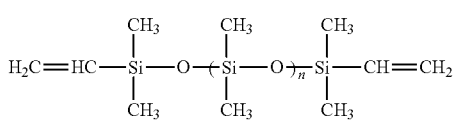

wherein n is an integer of 100 to 200, and
wherein the third polysiloxane has a structure of Chemical Formula 2:

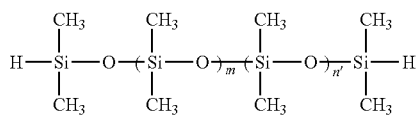

wherein n' is an integer of 1 to 100 and m is an integer of 1 to 100.

4. The polymer composition of claim 2, wherein the first silicone-based resin further comprises a platinum catalyst, and
the second silicone-based resin further comprises a retarding agent comprising a compound of formula

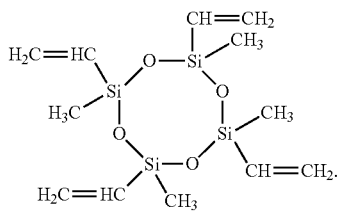

5. The polymer composition of claim 1, wherein the carbon fiber has a diameter of about 5 μm to 15 μm.

6. The polymer composition of claim 1, wherein the carbon fiber has a length of about 50 μm to 250 μm.

7. The polymer composition of claim 1, wherein the carbon fiber has a thermal conductivity of about 500 W/mK to 900 W/mK.

8. The polymer composition of claim 1, wherein the carbon fiber has a density of about 2.00 g/cm³ to 2.40 g/cm³.

9. The polymer composition of claim 1, wherein the inorganic filler is aluminum hydroxide (Al(OH)₃) having a diameter of about 1 μm to 100 μm, aluminum oxide (Al₂O₃) having a diameter of about 2 μm to 150 μm, and a mixture thereof.

10. The polymer composition of claim 1, wherein the hollow glass beads have a density of about 0.2 g/cm³ to 0.8 g/cm³.

11. The polymer composition of claim 1, wherein the hollow glass beads have a thermal conductivity of about 0.1 W/mK to 0.2 W/mK.

12. The polymer composition of claim 1, wherein the hollow glass beads have a diameter of about 35 μm to 45 μm.

13. A heat dissipation pad, comprising a thermally conductive polymer composition of claim 1.

14. The heat dissipation pad of claim 13, wherein the heat dissipation pad has a thermal conductivity of about 1.5 W/mK to 5.0 W/mK and/or a specific gravity of about 1.1 to 1.5.

15. A vehicle comprising a heat dissipation pad of claim 13.

16. A method of manufacturing a heat dissipation pad, comprising:
preparing an admixture A by admixing a first silicone-based resin comprising a first polysiloxane containing one or more vinyl groups at both ends thereof with a carbon fiber;
preparing an admixture B by admixing a second silicone-based resin comprising a second polysiloxane containing one or more vinyl groups at both ends thereof and a third polysiloxane containing one or more of Si—H bonds at both ends thereof with hollow glass beads;
obtaining a thermally conductive polymer composition by mixing the admixture A, the admixture B and an inorganic filler; and
forming the thermally conductive polymer composition into a predetermined shape of the heat dissipation pad and then curing.

17. The method of claim 16, wherein the carbon fiber has a diameter of about 5 μm to 15 μm, a length of about 50 μm to 250 μm, a thermal conductivity of about 500 W/mK to 900 W/mK, and/or a density of about 2.00 g/cm³ to 2.40 g/cm³.

18. The method of claim 16, wherein the hollow glass beads have a density of about 0.2 g/cm³ to 0.8 g/cm³, a thermal conductivity of about 0.1 W/mK to 0.2 W/mK, and/or a diameter of about 35 μm to 45 μm.

19. The method of claim 16, further comprising applying the polymer composition on a substrate to form the predetermined shape in a sheet or a roll.

20. The method of claim 16, wherein a temperature for the curing ranges from a room temperature to about 200° C.

* * * * *